United States Patent [19]
Tanzer et al.

[11] Patent Number: 5,499,185
[45] Date of Patent: Mar. 12, 1996

[54] DUCTED AIR-COOLED SECONDARY OF AUTOMOBILE BATTERY CHARGING TRANSFORMER

[75] Inventors: Herbert J. Tanzer, Topanga; William Quon, Alhambra; John T. Hall, Woodland Hills, all of Calif.

[73] Assignee: Hughes Aircraft Company, Los Angeles, Calif.

[21] Appl. No.: 146,690

[22] Filed: Nov. 2, 1993

[51] Int. Cl.[6] .......................... H02M 7/06; H01F 27/08; H01F 27/30
[52] U.S. Cl. .................. 363/126; 336/59; 336/60; 336/83; 336/DIG. 2; 363/141
[58] Field of Search ...................... 320/2; 336/60, 336/61, 59, 58, 55, 183, DIG. 2, 83; 361/689; 363/141, 126

[56] References Cited

U.S. PATENT DOCUMENTS

| | | | |
|---|---|---|---|
| 4,588,972 | 5/1986 | Harumoto et al. | 336/58 |
| 4,956,626 | 9/1990 | Hoppe et al. | 336/60 |
| 5,216,402 | 6/1993 | Carosa | 336/DIG. 2 |

*Primary Examiner*—Thomas J. Kozma
*Attorney, Agent, or Firm*—Leonard A. Alkov; W. K. Denson-Low

[57] ABSTRACT

The inductive charge coupler carrying the transformer primary is supplied with coolant fluid. The inductive charge receptacle mounted on the automobile has interior cooling fluid passages and there is a duct to transfer the cooling fluid from the inductive charge coupler to the cooling fluid passages in the inductive charge receptacle.

18 Claims, 2 Drawing Sheets

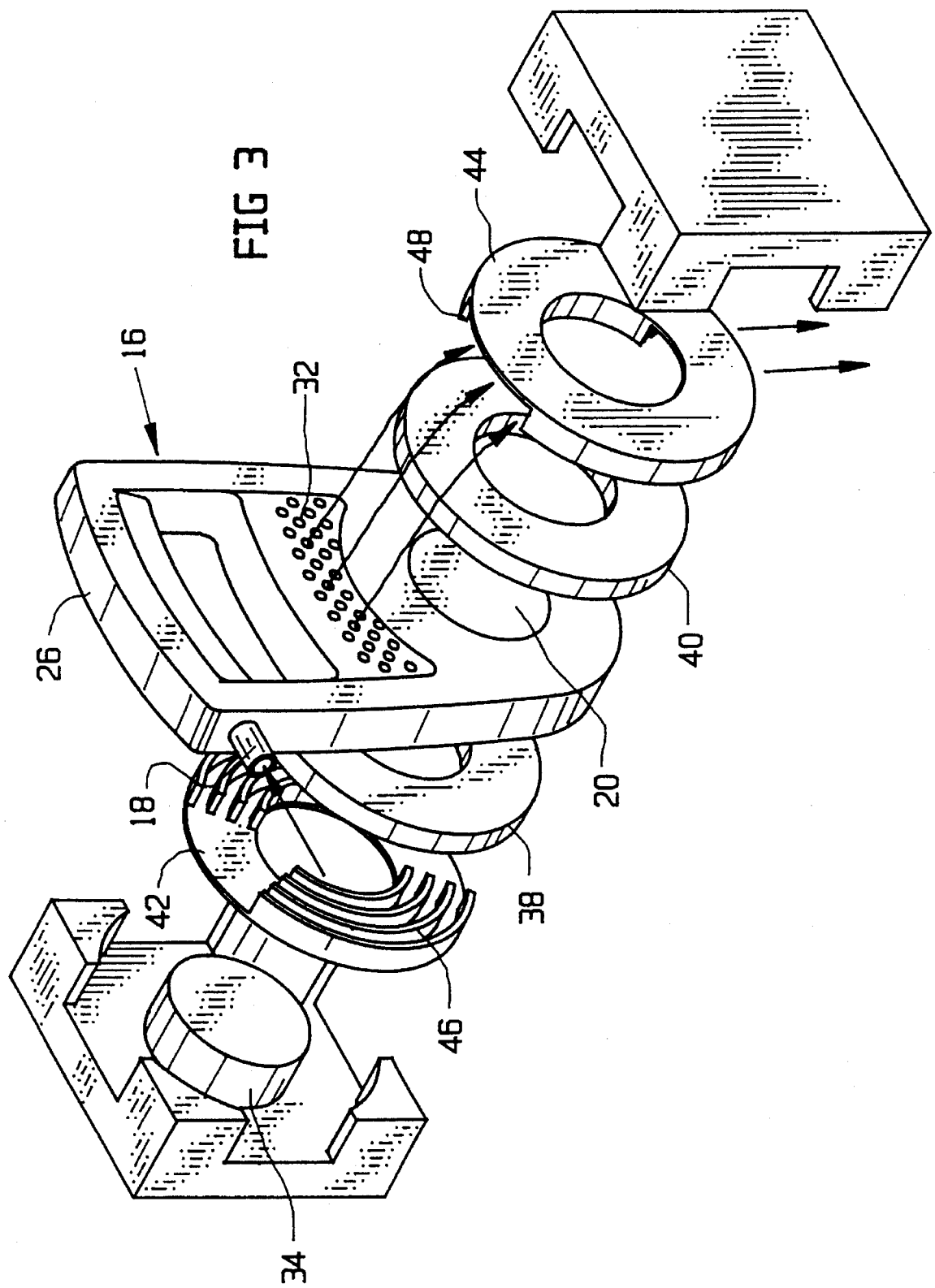

5,499,185

DUCTED AIR-COOLED SECONDARY OF AUTOMOBILE BATTERY CHARGING TRANSFORMER

FIELD OF THE INVENTION

In charging the batteries of automobiles, a transformer primary inductive charge coupler is inserted into the transformer secondary inductive charge receptacle on the automobile, which charges the batteries of the automobile. The primary inductive charge coupler supplies ducted cooling air to cool the transformer secondary for increased performance.

BACKGROUND OF THE INVENTION

In order to reduce air pollution, there is a modern trend toward electrically powered automobiles. These electrically powered automobiles have rechargeable batteries therein. The power of the batteries is used to propel the automobile and to provide for other power needs thereof. The design of such a vehicle is a careful balance between payload, performance, range between charging, acceleration, and speed. No matter what the combination of these criteria, there is need to recharge the batteries periodically so that the automobile may be taken on another excursion. With fairly large batteries, there is need to recharge a substantial amount of power. Since the recharging time when an automobile is unavailable should be minimized, high charging rates are desirable. If an ordinary plug is to be used, the plug must be suited for high power, which brings about a risk of harm to the operator and/or other people in the vicinity from contact with parts of the electrical supply system.

It is, thus, desirable to make a coupling between the charging station and the automobile which does not require the direct transfer of electricity. A magnetic coupling is desirable. In accordance with this invention, an inductive charge coupler can be manually handled and inserted in an appropriate inductive charge receptacle slot in the automobile. The inductive charge coupler is a transformer primary and contains an appropriate magnetic core. The inductive charge receptacle slot contains the transformer secondary winding(s) together with the rest of the magnetic core. The transformer secondary in the automobile is connected through appropriate electrical equipment to the battery for the charging thereof.

The frequency is preferably higher than the ordinary power line frequency, and high charge rates are above 10 kilowatts. The result is that the amount of heat dissipated from the transformer coils, magnetic coils and other electronics contained within the inductively coupled separable transformer can exceed 50 watts. It is desirable to cool the entire transformer and its associated electronics, such as rectifiers, so that internal temperatures do not exceed the critical operating range of the materials used in the transformer, rectifier junction or surface touch temperatures to maximize performance.

Cooling could be achieved by cooling devices in the automobile, but it is desirable to limit the total automobile weight as much as possible. It is, thus, desirable to improve the cooling methods for the inductive charge coupler. It is also useful to employ offboard cooling sources to efficiently cool the transformer secondary coil and the related magnetic core. The use of offboard cooling at the charging station permits cooling air to be provided through the inductive charge coupler connections and inductive charge coupler. When the inductive charge coupler is inserted into the onboard transformer secondary inductive charge receptacle, there is direct coupling with internal air flow passages in the transformer secondary and associated electronics such as rectifiers and capacitors associated wit the inductive charge receptacle. This arrangement couples large offboard cooling capacity with onboard transformer and electronics cooling, thereby vastly extending the cooling capacity. As a result, the charging transformer can be more compact, lighter, more efficient and more reliable. This offboard cooling reduces the temperature of the entire transformer and associated electronics and reduces the surface temperature of the removable primary inductive charge coupler.

SUMMARY OF THE INVENTION

In order to aid in the understanding of this invention, it can be stated in essentially summary form that it is directed to an inductive charge coupler which is connected to an offboard electric power supply and an offboard coolant supply, together with coolant fluid ducting in the inductive charge coupler and in the inductive charge receptacle at the transformer secondary on the car so that the transformer secondary is cooled.

It is, thus, a purpose and advantage of this invention to provide a system for automobile battery charging which includes a transformer having a separable and cooled primary so that the primary may be energized from a stationary source and inserted into the transformer to energize the magnetic circuit therein and the electrical secondary circuit therein.

It is another purpose and advantage of this invention to provide an automobile battery charging system which includes a transformer having a portion thereof separable from the automobile with the separable portion supplying cooling fluid from sources away from the automobile so that the separable portion delivers cooling fluid to the transformer secondary and other cooling needs on the automobile.

It is another purpose and advantage of this invention to provide a transformer which is separable, with a portion mounted on a vehicle for the charging of the batteries on the vehicle and the other portion being separable and powered from an off-vehicle source. Cooling fluid is provided to the separable portion to cool the portion mounted on the vehicle to result in improved electrical performance and reduced temperature of the mounted portion.

It is a further purpose and advantage of this invention to provide a separable automobile battery charging transformer, a portion of which remains on the automobile and a portion of which is separable therefrom so as to be permanently connected to a power supply. The separable portion delivers cooling fluid, which acts to cool the portion permanently installed in the automobile.

Other purposes and advantages of this invention will become apparent from a study of the following portion of the specification, the claims and the attached drawings wherein:

BRIEF DESCRIPTION OF THE DRAWINGS

FIG. 3 is an exploded view of the structure shown in FIG. 2 to illustrate the fluid flow path.

DESCRIPTION OF THE PREFERRED EMBODIMENTS

Automobile 10 is an automotive vehicle configured for the transportation of a few people and a small amount of baggage. It carries batteries which power motors which are connected to the road wheels. Suitable electrical and mechanical controls are provided to control the speed and direction of the vehicle. The onboard battery must be recharged periodically. In the system in accordance with this invention, charging power comes from a fixed power source 12 which is located adjacent the position where the automobile 10 will be parked when the owner is resting, working or shopping. In the present illustration, the automobile 10 is parked on its driveway 14 near the home of the owner of the automobile.

Figure 1:
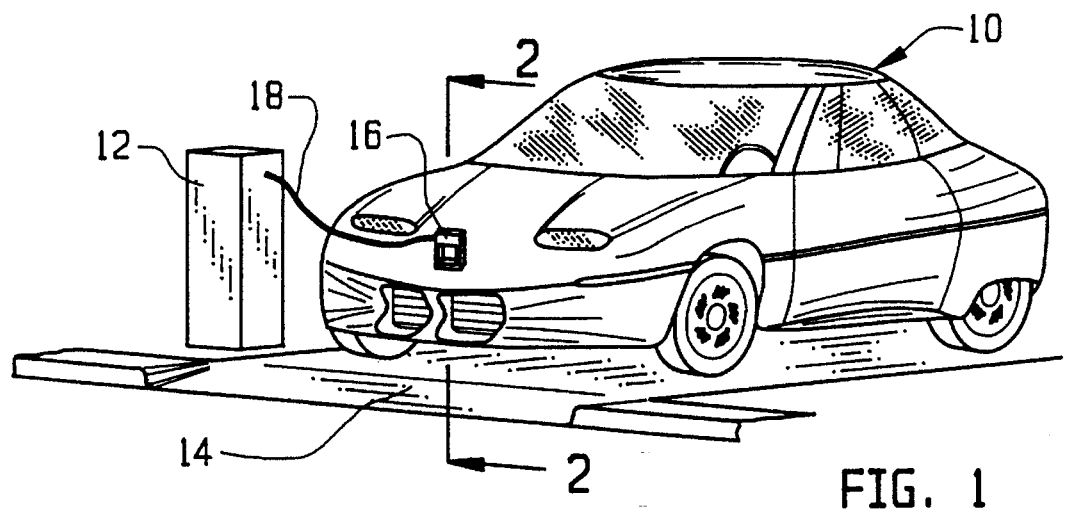
FIG. 1 is a perspective view of an electrically powered automobile which is connected to a stationary battery charging source.
Figure 2:
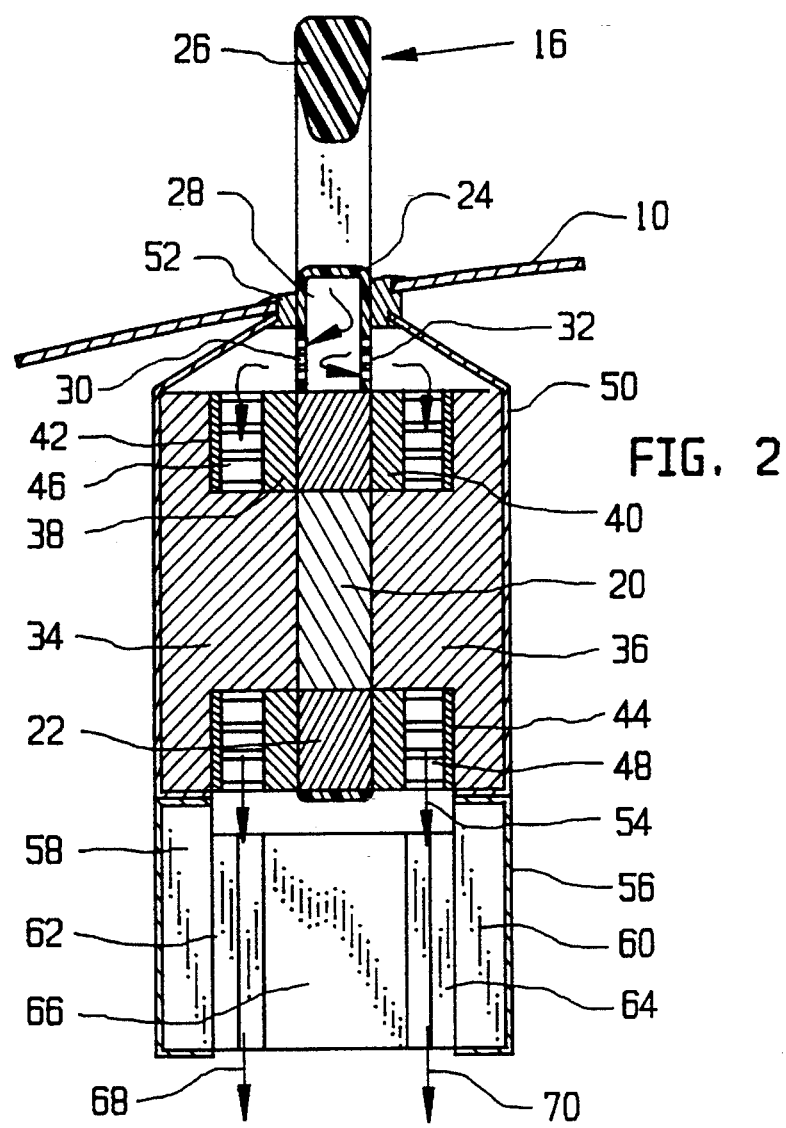
FIG. 2 is a section through the primary inductive charge coupler and secondary transformer inductive charge receptacle structure showing the cooling fluid path therethrough and through the associated electronics housing containing rectifiers.

It is presupposed by this invention that the automobile will not be directly powered from the power source 12 by means of a direct plug-in, but the charging connection will be inductive. A transformer is designed to receive power from the power source 12 and to deliver the power through magnetic coupling to a transformer secondary coil in the automobile. The secondary coil is appropriately connected through electronics to charge the automobile batteries. The power supply frequency is chosen in connection with the overall power supply parameters, including the transformer parameters. Inductive charge coupler 16, seen plugged into the automobile 10 in FIG. 1 and seen in enlarged sectional view in FIG. 2, is connected to the fixed power source by means of cable 18. The cable 18 incorporates the electrical connections. As seen in FIGS. 2 and 3, the inductive charge coupler 16 includes core 20, which is magnetically permeable such as ferrite and which is part of the magnetic circuit of the transformer. The balance of the magnetic circuit is in the automobile in association with the transformer secondary windings. Primary winding 22 surrounds the core 20 in a dielectric housing 24.

Inductive charge coupler 16 includes a handle 26 by which the inductive charge coupler can be manually inserted into its inductive charge receptacle port in the automobile. The handle 26 receives the cable 18, as seen in FIG. 3. In addition to the electrical cable, the cable 18 includes a cooling fluid passage, preferably for cooling fluid which can be discharged to the atmosphere, such as air. The cooling fluid is pressurized and is preferably cooled below the ambient. Such can be conveniently achieved in the power source 12, which has neither power nor weight limitations. The fluid is delivered into the handle and into the fluid passage 28 in the inductive charge coupler, see FIG. 2. The cooling fluid may pass through passages in the inductive charge coupler which cool the core 20 and primary windings 22. In any event, at the end of its passage through the inductive charge coupler, it is discharged from inductive charge coupler outlets 30 and 32, see FIG. 2.

The transformer secondary, which is magnetically coupled to the transformer primary in the inductive charge coupler includes cores 34 and 36 which face the core 20 and which are part of the magnetic circuit. The cores 34 and 36 are of magnetic material. In the inductive charge receptacle, secondary windings 38 and 40 surround the cores 34 and 36 and lie against the primary winding 22. Cooling plates 42 and 44 carry fins 6 and 48 thereon. The fins are open at the top and the bottom. Around the sides, the fins guide the coolant fluid directly adjacent the secondary.

Secondary housing 50 surrounds the secondary windings and extends upward to the inductive charge receptacle port 52 in the automobile into which the inductive charge coupler is inserted. In that position, the secondary housing receives and controls the air exiting from the inductive charge coupler outlets 30 and 32. The only downward opening is adjacent the cooling plates 42 and 44 between the fins. At the bottom, the fins have an opening and the secondary housing has an opening so that the air is discharged out of the cooling fluid outlet 54.

Electronics housing 56 is secured directly to the secondary housing 50 and receives the cooling fluid issuing from the cooling fluid outlet 54. Electronics housing 56 carries various electronics useful in the powering and control of the automobile 10. Of course, rectifiers are necessary to rectify the alternating current output of the secondary windings and regulate the voltage for the charging of the automobile batteries. Thus, rectifiers 58 and 60 are specifically shown in FIG. 2. These rectifiers carry fins 62 and 64 in the coolant streams. Electronics 66 also carries fins in these coolant streams. The electronics 66 may be controlled electronics or may be additional rectifier structures. The exiting coolant streams 68 and 70 are exhausted from the system and preferably leaves the automobile. An exhaust fan may be applied to this stream, if necessary to provide the desired flow rate. In this way, offboard air which is properly routed with respect to the transformer secondary windings and magnetic field path during high-rate energy transfer provides higher cooling capacity because of the availability of higher coolant flow rates and refrigerated (if necessary) cooling air. In addition to the limiting of temperature in the transformer to keep the transformer component temperatures below critical values, it is also important to limit the temperature of the inductive charge coupler so that, when it is withdrawn at the end of a charging cycle, the inductive charge coupler surface temperature is sufficiently low as to not be harmful to the user. The outflowing coolant, preferably air, also cools the electronics.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fluid-cooled transformer comprising:
   a transformer primary comprising a primary winding and magnetic permeable material, said transformer primary being mounted on an inductive charge coupler, means to supply coolant fluid to said inductive charge coupler;
   a transformer secondary having a secondary winding adjacent an inductive charger receptacle and an associated magnetic permeable material, first walls defining a coolant fluid passage adjacent said transformer secondary, second walls defining said inductive charge receptacle to removably receive said transformer primary inductive charge coupler and a duct for ducting coolant fluid from said primary winding through said coolant fluid passage adjacent said transformer secondary to said secondary winding.

2. The fluid-cooled transformer of claim 1 wherein there are first and second windings for said transformer secondary and said first walls define first and second coolant fluid channels of said coolant fluid passage respectively adjacent said first and second windings for said transformer secondary and said first and second windings for said transformer secondary are on opposite sides of said receptacle which removably receives said inductive charge coupler.

3. The fluid-cooled transformer of claim 2 wherein a flexible cable is connected to said inductive charge coupler to supply electric power to said transformer primary and a flexible coolant fluid hose is connected to said inductive charge coupler to supply coolant fluid to said inductive charge coupler.

4. The fluid-cooled transformer of claim 1 wherein a flexible cable is connected to said inductive charge coupler to supply electric power to said transformer primary and a flexible coolant fluid hose is connected to said inductive charge coupler to supply coolant gas to said inductive charge coupler.

5. The gas-cooled transformer of claim 4 wherein a receptacle housing surrounds said inductive charge coupler where it enters said secondary, said housing serving as a duct to duct coolant gas from said inductive charge coupler to coolant fluid passage adjacent said transformer secondary.

6. The gas-cooled transformer of claim 5 wherein said transformer secondary is connected to charge the battery in an automobile.

7. The gas-cooled transformer of claim 6 wherein said cable is connected to an electric power source and said inductive charge coupler is connected to a source of coolant gas.

8. The gas-cooled transformer of claim 5 further including an electronic housing adjacent said receptacle housing positioned so that said electronic housing receives the coolant gas issuing from said receptacle housing, electronics in said electronics housing positioned to be cooled by said coolant gas so that coolant gas issuing from said receptacle housing passes through said electronics housing to cool the electronics therein.

9. The gas-cooled transformer of claim 8 wherein said electronics comprises rectifiers connected to said transformer secondary.

10. A gas-cooled transformer comprising:
   a transformer secondary including a transformer secondary winding and a magnetic core associated with said transformer secondary winding, said transformer secondary winding and its magnetic core comprising an inductive charge receptacle, walls defining a cooling gas passage adjacent said secondary winding;
   an inductive charge coupler, said inductive charge coupler having a flexible connection thereto, said inductive charge coupler having a transformer primary electric winding thereon and having magnetic core material thereon, said inductive charge coupler being configured so that said inductive charge coupler can be inserted into said inductive charge receptacle and said transformer primary winding placed adjacent said transformer secondary winding so as to create magnetic coupling between said inductive charge coupler and said transformer winding secondary for the transfer of electric power between said transformer primary winding and said transformer secondary winding;
   a source of coolant gas connected to said inductive charge coupler, said inductive charge coupler having a coolant gas outlet therefrom, said coolant gas outlet on said inductive charge coupler being configured to deliver coolant gas to said coolant gas passage adjacent said transformer secondary winding to cool said transformer secondary winding.

11. The gas-cooled transformer of claim 10 wherein a housing engages said transformer secondary, said housing also receiving said coolant gas outlets on said inductive charge coupler so that said housing serves as a duct to duct coolant gas from said inductive charge coupler to said coolant gas passages and adjacent said secondary winding.

12. The gas-cooled transformer of claim 11 wherein there are first and second transformer secondary windings and there is a slot between said secondary windings, said slot comprising said inductive charge receptacle, said inductive charge coupler being insertable into said slot so that inductive charge coupler primary windings magnetically couple to said secondary windings.

13. The gas-cooled transformer of claim 12 wherein said transformer is connected for the charging of the battery of an automobile.

14. The gas-cooled transformer of claim 13 wherein said inductive charge coupler is connected to a source of electric power and said coolant gas housing is connected to a source of coolant gas.

15. The gas-cooled transformer of claim 12 wherein said walls defining a cooling gas passage adjacent said secondary winding also define a cooling gas passage through an electronics housing and further including electronics in said electronics housing.

16. The gas-cooled transformer of claim 15 wherein said electronics in said electronics housing comprise rectifiers connected to said transformer secondary.

17. The gas-cooled transformer of claim 10 wherein said walls defining a cooling gas passage adjacent said secondary winding also define a cooling gas passage through an electronics housing and further including electronics in said electronics housing.

18. The gas-cooled transformer of claim 16 wherein said electronics in said electronics housing comprise rectifiers connected to said transformer secondary.

* * * * *